Dec. 15, 1970    J. B. BUICE ET AL    3,548,265
POROUS ANODE CAPACITOR
Filed June 11, 1968
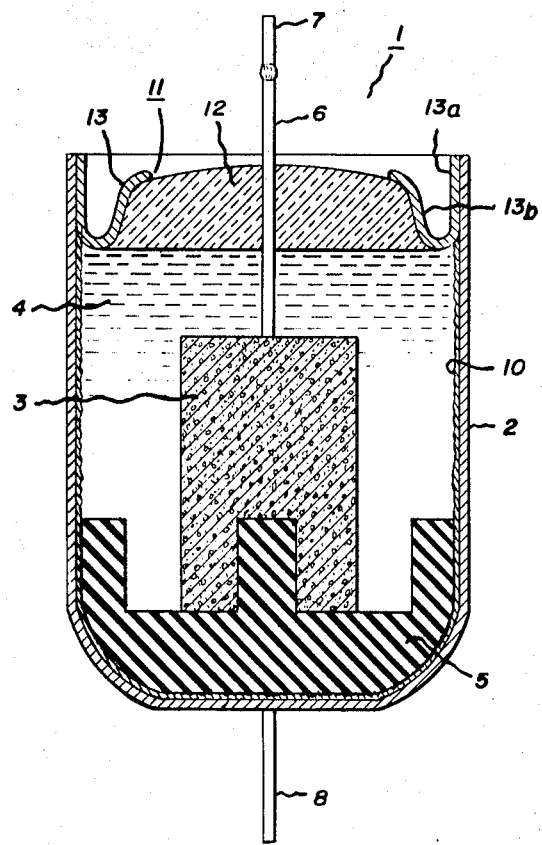
INVENTORS:
JOEL B. BUICE,
RAYMOND M. TREWHELLA,
BY James J. Lichiello
THEIR ATTORNEY.

United States Patent Office 3,548,265
Patented Dec. 15, 1970

3,548,265
POROUS ANODE CAPACITOR
Joel B. Buice and Raymond Matthew Trewhella, Columbia, S.C., assignors to General Electric Company, a corporation of New York
Filed June 11, 1968, Ser. No. 736,055
Int. Cl. H01g 9/08
U.S. Cl. 317—230                                6 Claims

ABSTRACT OF THE DISCLOSURE

A liquid electrolyte porous anode capacitor having a titanium metal casing which serves as the cathode will not fail due to dielectric film degration inducted by cathode plating as a result of reverse voltage. Forming the capacitor casing of titanium also permits the bonding thereof to a titanium-to-glass seal closure to provide a capacitor essentially free of weight loss due to electrolyte leakage.

BACKGROUND OF THE INVENTION

Field of the invention

The present invention relates to electrolytic capacitors and more particularly to an electrolytic capacitor wherein the cathode or casing is formed principally of titanium to eliminate possible capacitor failure as a result of reverse voltage.

Description of the prior art

Presently available polar liquid or gel electrolyte porous anode type capacitors are characterized by a salient weakness which can result in catastrophic failure of the device. This weakness is the ultimate breakdown of the dielectric film, between the anode and cathode, caused by transport of metal from the case or enclosure to the dielectric on the anodic electrode as a result of negative or reverse bias. This action is the process of electro-plating whereby metallic ions are transported through an electrolyte in accordance with Faraday's Law.

The porous anode type of electrolytic capacitor may be considered as essentially a plating cell since it contains two metallic electrodes, one of which may yield metallic ions as a consequence of current flow, and an electrolyte between two electrodes. Conventional liquid or gel electrolyte porous anode capacitors use a case or enclosure, serving as a cathode, of a metal such as silver, copper, nickel and the like. When the device is biased in the proper direction, namely when the case is cathodic, no plating action occurs since the anode is made of a nonplating oxide film forming or valve metal. However, if a reverse bias is applied to this device, i.e., where the case or cathode is positive with respect to the anode, then metallic plating occurs since the dielectric is polar, and metal is deposited directly on the oxide film at impurity sites or sites of highest conductivity. With these metals in intimate contact with the dielectric, the application of normal or forward bias voltage results in reduced dielectric strength and degradation of the oxide film, thereby yielding high leakage current and/or a catastrophic shorted condition.

SUMMARY OF THE INVENTION

It is, therefore, an object of the present invention to provide an improved electrolytic capacitor which does not suffer from susceptibility to reverse voltage and which avoids the possibility of cathode plating on the dielectric film.

It is another object of this invention to provide an improved liquid or gel electrolyte porous anode capacitor which is hermetically sealed to preclude weight loss under ordinary use conditions.

Other objects and advantages will become apparent from the following description and appended claims.

In accordance with the objects of this invention a liquid or gel electrolyte porous anode capacitor is provided which utilizes principally titanium metal for the case or cathode, and which by virtue of the non-plating characteristic of titanium is not susceptible to dielectric film degradation as a result of reverse voltage. In particular, the use of titanium as the case material essentially eliminates the plating possibility since such metal forms a barrier layer and does not plate in the capacitor environment. When the case is constructed of titanium the capacitor may be effectively hermetically sealed at the anode lead by a titanium-to-glass seal, particularly where the anode lead is also of tantalum titanium or other metal easily sealed to glass.

BRIEF DESCRIPTION OF THE DRAWINGS

The invention will be better understood from the following description taken in conjunction with the accompanying drawing wherein:

FIG. 1 illustrates a liquid or gel electrolyte porous anode capacitor to which the present invention is applicable.

DESCRIPTION OF THE PREFERRED EMBODIMENTS

Referring now to FIG. 1, there is shown an electrolytic capacitor 1 comprising a titanium cup-shaped casing 2 and containing a sintered pellet anode 3 inserted therein, the casing serving as the cathode and having a cathode terminal lead 8 secured thereto. The inner surface of the casing 2 preferably has an adherent conducting layer 10 coated thereon to provide enhancement of the cathode area. The porous sintered anode 3 can be any of the well-known valve forming metals such as aluminum, zirconium, niobium, tantalum, etc., selected in accordance with the particular application for which it is desired, the electrolyte which is to be used and commercial cost considerations. Tantalum is the preferred anode material for most applications. The anode has an oxide dielectric film (not shown) formed over all surfaces thereof as is well known in the art. Anode 3 is immersed in a liquid or gel electrolyte 4 contained in casing 2. The electrolyte may be of any conventional or known type of capacitor electrolyte provided that it is not corrosive to the casing metal and will be suitable for the particular capacitor application. Electrolytes such as sulfuric acid or other corrosive acid containing electrolytes are not suitable for use with a titanium casing. One preferred electrolyte is lithium chloride.

In a usual construction, casing 2 is cup-shaped in form having a single open end which is hermetically sealed to an anode lead seal structure. Within casing 2 there is positioned a bottom spacer 5 made of a chemically resistant insulating material having low vapor transmission and moisture absorbent characteristics, such as polytetrafluoroethylene (Teflon). Passing through the open end and extending outwardly of casing 2 is terminal lead wire 6, typically composed of tantalum, or other equivalent film forming metal having similar thermal expansion properties, and having an anodic dielectric oxide film formed thereon. Lead wire 6 is secured at its inner end to anode 3, and at its outer end is welded or otherwise joined to an external lead 7, usually composed of a solderable metal such as nickel, copper or the like.

Casing 2 is preferably closed by a glass-metal seal structure 11 to provide a strong, hermetic seal which is compatible with electrolyte 4 and effectively prevents its escape from within casing 2 even under severe operating conditions of widely varying temperature and pressure.

A glass-metal seal preferred for use on capacitors embodying the present invention is disclosed in U.S. Pat. 3,275,901—Merritt et al., assigned to the same assignee as the present invention. Briefly, the seal structure comprises a metal retaining ring 13 having a rim portion 13A adapted to be secured to the adjacent wall portion of casing 2 by welding, soldering or other suitable means and a tapered conical seal surface 13B in which glass material 12 is received. Glass 12 includes an axial opening for passage of lead wire 6 therethrough, and is fusion sealed to ring 13 and lead 6. In accordance with the present invention both casing 2 and retaining ring 13 are formed of titanium to avoid corrosion resulting from galvanic action between dissimilar metals and to improve metallurgical bonding of the components.

By virtue of forming the casing cathode of titanium the performance and reliability of the liquid or gel porous anode capacitor is significantly improved in at least two respects. First, the problems associated with catastrophic failure due to reverse voltage are essentially eliminated because the titanium casing forms a barrier layer and metal therefrom will not plate upon the anode dielectric film. Second, the titanium casing permits the open end of the casing to be hermetically sealed by a titanium-to-glass seal which in 12,000 hour life tests at maximum rated conditions, has been shown to reduce electrolye leakage and weight loss over conventional elastomer seal-silver case devices. The titanium may also be employed as a layer, laminate, or coating on a casing structure.

In order to demonstrate the remarkable effectiveness of the present invention in extending and prolonging capacitor life under reverse voltage conditions, sample capacitors were constructed and tested.

The test capacitors included anodized porous tantalum anodes of conventional design immersed in a 7 molar lithium chloride electrolye and housed within etched and internally coated titanium cases. The open ends of the casings were sealed by titanium-to-glass hermetic seals in accordance with the disclosure of aforementioned U.S. Pat. 3,275,901. The internal case coating, to enhance the cathode area, was applied using conventional techniques for electrodeposition of noble metals. Noble metal coatings such as platinum, palladium and rhodium are preferred since it has been found that they tend to adhere more strongly to the casing wall. In order to assure a clean and barrier-free surface for the deposition of the noble metal coating upon titanium it is preferred that the casings be stored in distilled water at room temperature immediately following the etching process. This prevents the formation of an air oxide prior to deposition of the noble metal and results in good adhesion of the coating to the titanium casing.

EXAMPLE I

Capacitors made in accordance with the foregoing description and rated at 300 µf.-6 v. and 90 µf.-30 v., respectively, were tested by initially subjecting the capacitors to maximum rated conditions, without the application of any reverse voltage, to obtain reference readings. The capacitors were then subjected to a continuously applied reverse voltage of 0.5 v. DC (volts D.C.) for 1,000 hours at which time the leakage current was monitored. The reverse voltage was then increased to a continuously applied value of 1.0 v. DC and the leakage current monitored at 2,000 hours and 3,000 hours. The results are shown in Table I. It is noteworthy that over this same period of time the capacitance and dissipation factor of the capacitors remain substantially unaffected.

Capacitors made in accordance with the foregoing description and rated at 60 µf.-50 v. were similarly tested except that they were exposed to a 1.0 v. DC reverse voltage for the full 3,000 hours. The results are shown in Table I.

TABLE I
[Leakage current at 25° C. (µa.)]

| Rating | Reference | Hours | | |
|---|---|---|---|---|
| | | 1,000 | 2,000 | 3,000 |
| 300µf., 6v | 0.5 | 0.5 | 1.0 | 2.7 |
| | 0.5 | 0.5 | 1.0 | 2.1 |
| 90µf., 30v | 0.5 | 1.0 | 2.0 | 2.6 |
| | 0.5 | 1.5 | 2.0 | 2.6 |
| 60µf., 50v | 0.5 | 4.0 | 4.4 | 6.0 |
| | 0.5 | 3.0 | 4.0 | 4.6 |

In order to compare the results of the present invention with conventional capacitors, tantalum porous anode capacitors having a 7M lithium chloride electrolyte were housed in a silver casing. The only material difference between these capacitors and those of Example 1 was the casing metal.

EXAMPLE II

Capacitors having a silver case, as heretofore described, rated at 30 µf.-50 v. were tested at room temperature with 0.5 v. DC continuously applied in the reverse direction. In view of the expected short lives of these capacitors under test conditions, leakage current was monitored at frequent intervals. The results are shown in Table II.

TABLE II
[Leakage current at 25° C. (µa.)]

| Rating | Reference | Hours | | | | |
|---|---|---|---|---|---|---|
| | | 24 | 48 | 72 | 100 | 436 |
| 30µf., 50 v | .05 | 2,000 | 6,000 | 17,000 | Shorted | |
| | .05 | 2,000 | 41,000 | Shorted | | |
| | .05 | 2,000 | 12,000 | Shorted | | |
| | .05 | 2,000 | 3,000 | 7,000 | 4,000 | 100,000 |
| | .05 | 6,000 | 18,000 | 50,000 | Shorted | |

From a comparison of Tables I and II is is evident that silver case conventional capacitors are extremely short lived under a continuously applied reverse voltage. Since most circuits requiring liquid or gel electrolyte porous anode capacitors cannot tolerate a leakage current much in excess of 200 µa., the capacitors of Table II are unsuitable for these circuits under reverse voltage conditions.

The titanium cased capacitors of the present invention, on the other hand, exhibit favorable electrical properties over prolonged periods of unfavorable reverse voltage conditions. The great improvement evidenced by these capacitors is directly attributable to the non-plating characteristics of the titanium cathode-casing.

While the present invention has been described with reference to particular embodiments thereof, it will be understood that numerous modifications may be made by those skilled in the art without actually departing from the scope of the invention.

What is claimed as new and desired to be secured by Letters Patent of the United States is:

1. An electrolytic capacitor capable of withstanding prolonged continuous reverse voltage with low leakage current comprising:
   (a) a casing of a film-forming metal normally serving as the capacitor cathode and having an open end,
   (b) a noble metal coating on the inner wall of said casing,
   (c) means forming a rectifying barrier layer dielectric oxide film on said inner wall between said inner casing wall and the noble metal coating, said oxide film having high electrical resistivity in one direction and low electrical resistivity in the other direction,
   (d) a cathode lead connected to said casing,
   (e) a sintered porous anode formed of a film-forming metal in said casing,
   (f) an electrolyte in said casing in contact with said casing and said anode, said electrolyte being non-corrosive relative to the casing metal and to said anode, (g) said anode having a terminal lead extending through said open end of the casing; and (h) a closure hermetically sealing said open end.

2. An electrolytic capacitor according to claim 1, said film-forming metal of the casing consisting essentially of titanium and said electrolyte consisting essentially of lithium chloride.

3. An electrolytic capacitor according to claim 1, said film-forming metal of the casing consisting essentially of tantalum.

4. An electrolytic capacitor according to claim 2, the film-forming metal of said sintered porous anode consisting essentially of tantalum.

5. An electrolytic capacitor according to claim 2, said closure comprising a glass to metal seal having a retaining ring of titanium.

6. An electrolytic capacitor according to claim 1, said dielectric oxide film being formed by application of reverse voltage to the capacitor.

References Cited

UNITED STATES PATENTS

| | | | |
|---|---|---|---|
| 2,368,688 | 2/1945 | Taylor | 317—230 |
| 2,910,633 | 10/1959 | Havey | 317—230 |
| 2,923,866 | 2/1960 | Wagner | 317—230 |
| 3,120,695 | 2/1964 | Burnham | 317—230 |
| 3,237,060 | 2/1966 | Ross | 317—230 |
| 3,275,901 | 9/1966 | Merritt et al. | 317—230 |
| 3,421,195 | 1/1969 | Berryhill | 317—230 |

JAMES D. KALLAM, Primary Examiner

U.S. Cl. X.R.

29—570